No. 778,582. PATENTED DEC. 27, 1904.
E. M. HOLMES.
HOISTING AND CONVEYING APPARATUS.
APPLICATION FILED APR. 18, 1904.
2 SHEETS—SHEET 1.
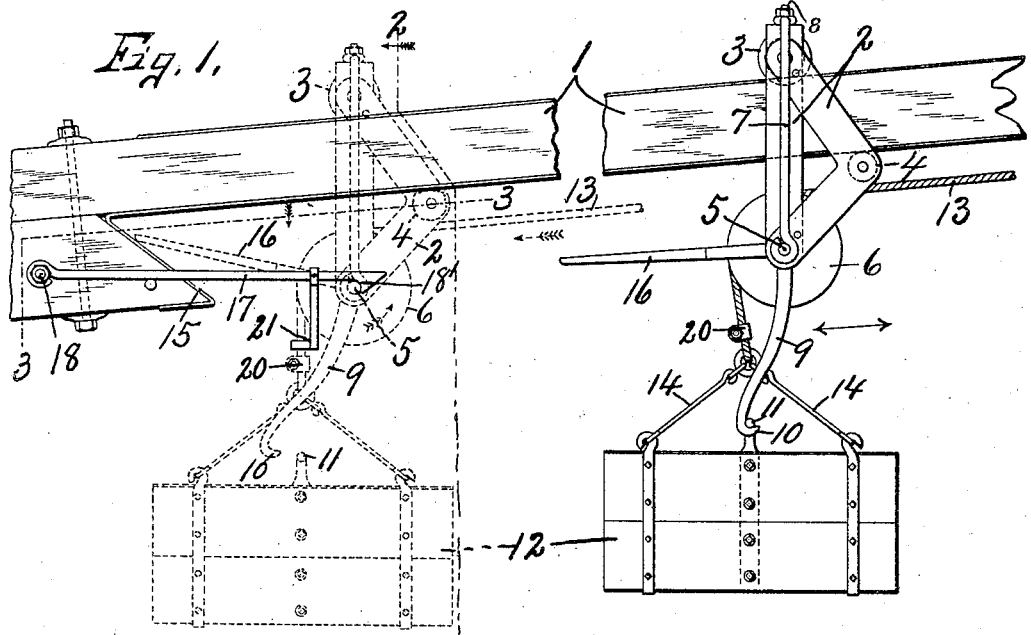
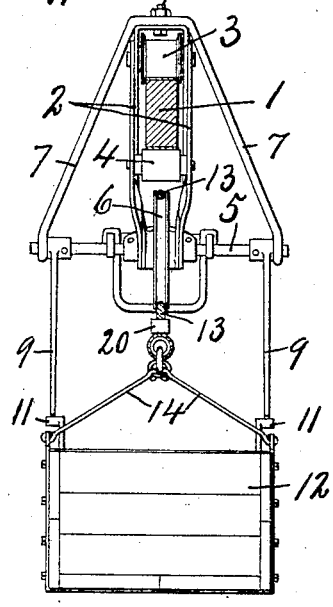
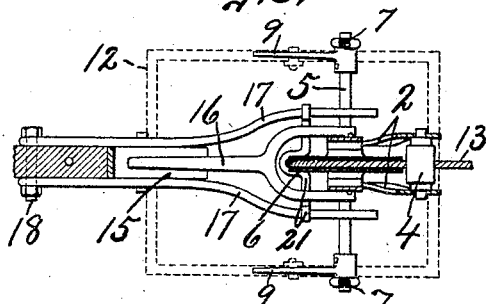
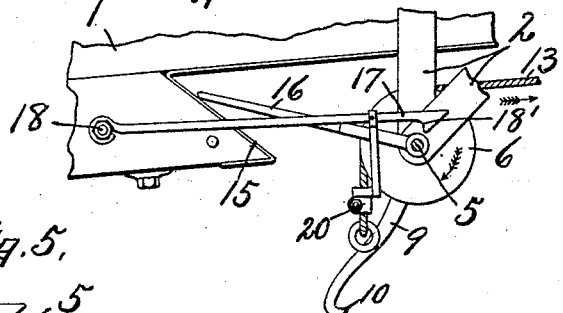
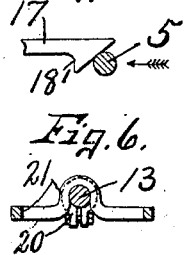
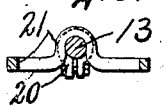
WITNESSES:
B. E. Robinson
H. E. Chase
INVENTOR:
E. M. Holmes
BY
Howard P. Denison
ATTORNEY.

No. 778,582. PATENTED DEC. 27, 1904.
E. M. HOLMES.
HOISTING AND CONVEYING APPARATUS.
APPLICATION FILED APR. 18, 1904.
2 SHEETS—SHEET 2.
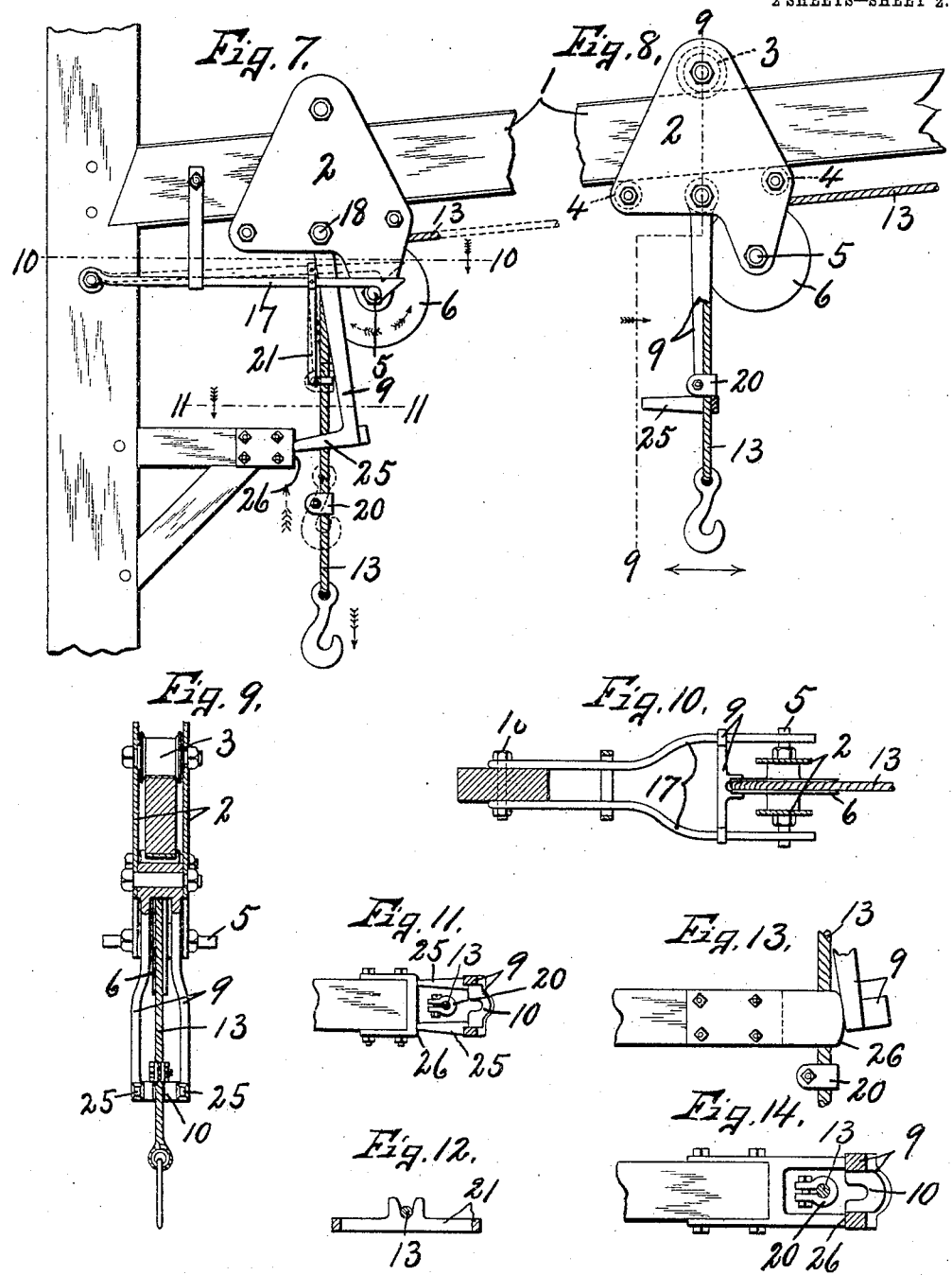
WITNESSES:
B. E. Robinson.
H. E. Chase.
INVENTOR:
E. M. Holmes
BY
Howard P. Denison
ATTORNEY.

No. 778,582. Patented December 27, 1904.

UNITED STATES PATENT OFFICE.

EDWIN MERRITT HOLMES, OF MANLIUS, NEW YORK.

HOISTING AND CONVEYING APPARATUS.

SPECIFICATION forming part of Letters Patent No. 778,582, dated December 27, 1904.

Application filed April 18, 1904. Serial No. 203,731.

*To all whom it may concern:*

Be it known that I, EDWIN MERRITT HOLMES, of Manlius, in the county of Onondaga, in the State of New York, have invented new and useful Improvements in Hoisting and Conveying Apparatus, of which the following, taken in connection with the accompanying drawings, is a full, clear, and exact description.

This invention relates to improvements in hoisting and conveying apparatus in which a loaded bucket is elevated from one locality by means of a single hoisting-cable and drawn up an inclined track or guide to the place of dumping by the same cable, after which the traveling carriage which supports the bucket is returned by gravity down the incline to the starting position and the bucket is automatically released from the carriage and its descent to the shaft or place of loading is controlled by the hoisting-cable.

The object is to control the transit of the bucket and its carriage to and from the place of loading and dumping by means of a single hoisting apparatus, such as a hoisting-engine and cable, thereby producing a saving of one hoisting-engine and its attendant.

Another more specific object is to permit the carriage and bucket to return from the dumping-place to the place of loading by gravity along an inclined track or guide.

A further object is to provide an automatic catch or detent for holding the carriage from being drawn forward during the descent of the bucket to the place of loading and to also provide means for transferring the load of the bucket and its contents from the cable to the carriage while the load is in transit to the place of discharge, the detent being released automatically just before the load of the bucket and its contents are transferred from the cable to the carriage.

Other objects and uses will appear in the following description.

In the drawings, Figure 1 is an elevation of the essential features of my improved hoisting and conveying apparatus, showing the bucket and its carriage in full lines as being drawn forward to or returned from the place of dumping by a suitable cable and also showing the same parts in dotted lines, except that the carriage is at the extreme lower end of the incline and held from forward movement by a suitable detent, while the catch or hook by which the bucket is suspended from the carriage is shown as released and the bucket is about to descend to the place of filling. Figs. 2 and 3 are sectional views taken on lines 2 2 and 3, Fig. 1. Fig. 4 is a side elevation of a portion of the lower end of the incline track or guide, showing a portion of the carriage and the means for controlling the operation of the detent and bucket-engaging hook. Figs. 5 and 6 are detail views, respectively, of one of the detents and the lug on the carriage with which it engages and also the tripping-pawl and cable which trips the detent. Fig. 7 is a front elevation of a portion of a slightly-modified form of hoisting and conveying apparatus, showing the carriage at the lower end of the track as locked from forward movement and the cable as descending. Fig. 8 is an elevation of the carriage as it appears while in transit to or from the place of dumping. Figs. 9, 10, and 11 are sectional views taken, respectively, on line 9 9, Fig. 8, and on lines 10 10 and 11 11, Fig. 7. Fig. 12 is a transverse sectional view through a portion of the cable and tripping-pawl for the detent seen in Fig. 7. Figs. 13 and 14 are side elevation and horizontal section of a slightly-modified form of cable-gripping device for transferring the load from the cable to the carriage when the detent is tripped.

Similar reference characters indicate corresponding parts in all the views.

In carrying out the objects hereinbefore stated I provide a suitable inclined track or guide 1, upon which is mounted a carriage 2, having rollers 3 and 4 engaging, respectively, the upper and lower surfaces of the track, the lower roller being arranged slightly in advance of the upper roller and serves to prevent cramping or binding of the carriage while moving along the track. This carriage is composed of metal plates or straps arranged at opposite sides of the track 1 and united to each other at points above and beneath the upper and lower faces of said track to prevent any possibility of lateral displacement of the carriage. The rollers 3 and 4 are journaled in these side walls or plates of the carriage, which extends some distance below the lower face of the track and receives a suitable shaft or tie-rod 5. A sheave or pulley 6 is rotatingly mounted upon the central portion of this shaft 5, between the lower ends of the sides of the carriage 2, the shaft 5 extending a considerable distance in opposite directions from the sides of the carriage, and its ends are supported from the upper end of the carriage by braces or hanger-arms 7. These braces 7 are preferably formed from a single piece of iron, the central portion of which is secured to the top of the carriage by a suitable clamping-bolt 8, and the arms 7 diverge outwardly and downwardly and are looped around the opposite ends of the shaft 5, so that the shaft is free to rotate or rock in the lower ends of the hangers 7.

A pair of grappling-hooks 9 are secured to the shaft 5, just inside of the lower ends of the arms 7, and extend downwardly from said shaft, and their lower ends are formed with hooks 10, Figs. 1 and 4, for engaging lugs 11 on the sides of the bucket or receptacle 12, whereby the bucket and its load are supported directly upon the carriage to relieve the strain upon the cable while the carriage is being drawn up the incline track to the place of discharge.

The cable 13 is mounted upon and renders over a sheave 6 and has one end connected to the bucket 12 through the medium of links 14, while the other end of the cable extends toward the high end of the track, or rather toward the place of discharge, and is usually connected to the winding-drum of a hoisting-engine, (not shown,) as the manner of operating this cable is immaterial, and it may be operated either by manual or mechanical power.

I usually provide a fixed abutment 15 at the lower end of the track, which in Figs. 1 and 4 consists of an incline bearing, and the swinging load-supporting member 9 is provided with a rearwardly-extending arm 16, the free end of which is caused to engage and ride upon the incline abutment 15 when the carriage 2 returns by gravity to the low end of the track, so that the arm 16 is rocked upwardly, and the supports 9 are correspondingly rocked out of engagement with the lugs 11 of the receptacle 12, thus releasing the receptacle and permitting it to be lowered by means of the cable 13. During this lowering operation of the receptacle 12 it is necessary to hold the carriage 2 from moving up the incline track, and I therefore provide a detent 17, which is pivoted at one end at 18 to a suitable fixed support, while its other end is free to move vertically and is provided with shoulders 18' to engage the ends of the shaft 5 to hold the carriage from movement up the incline track, the front lower face of said detent or catch being beveled, so that when the carriage is descending toward the abutment 15 the shaft 5 engages the beveled face and automatically elevates the detent until it passes behind the shoulder 18', whereupon the detent drops by gravity to bring the shoulder 18' into engagement with the front face of the shaft, thus locking the carriage in a certain position with reference to the abutment 15. This action of the detent is arranged to take place at about the same time or just before the support 9 is released from holding engagement with the lugs 11 of the bucket 12, and at this instant the load is of course transferred from the support 9 to the cable, and the receptacle 12 may then be lowered to the place of filling. This detent remains in its holding position during the elevation of the filled receptacle by means of the cable 13; but before the carriage can be drawn forward or up the incline track to the place of discharge it is necessary to trip the detent from its holding position, and in order to accomplish this I provide the portion of the cable adjacent to its connection with the box or receptacle with a stop-shoulder or clamping-lug 20 and also provide the detent with a depending stirrup 21, which straddles the cable above the shoulder 20, so that as the shoulder 20 continues to rise during the elevation of the receptacle said shoulder 20 engages the lower face of the stirrup 21, and thereby elevates the shoulder 18' out of holding engagement with the shaft 5. This releases the carriage, which is immediately drawn upward along the track by reason of the pull upon the cable, whereupon the arms 16 and support 9 drop by gravity until the hook 10 interlocks with the lug 11 to support the load directly on the arm 9 and remove the strain from the cable. It is now apparent that the cable may be wound upon any suitable drum to draw the carriage up the incline track to the place of discharge. I preferably provide two of these detents 17, one at each side of the sheave 6, and the arm 16 is usually bifurcated and secured to the shaft 5 at opposite sides of the sheave 6.

The device shown in Figs. 7 to 14, inclusive, is very similar to that just described, except that the carriage 2 is provided with two lower rollers engaged with the lower face of the incline track 1, and the swinging load-holding device or arm 9 is provided at its lower end with laterally-projecting arms 25, which straddle the cable 13 and are adapted to engage a fixed abutment 26 when the carriage descends to its lowest position, as seen in Fig. 7, and in this instance the clamp 20 on the cable 13 serves the double purpose of tripping the carriage-holding detent 17 through the medium of the depending arm 21 and also to engage the upper faces of the arms 25 when the detent 17 is tripped for transferring the load from the main portion of the cable to the support 9, which is pivotally hung at 18 upon the carriage 2. The arms 25 are separated a sufficient distance to permit the clamp 20 to be drawn upwardly between the arms, so as to engage the member 12 and trip the detent 17, whereupon the carriage is immediately drawn forward by the weight of the load and also by the hauling device, (not shown,) and the arm 9 immediately rocks rearwardly, thus bringing the arms 25 beneath the clamp 20, so as to receive and support the clamp and the load carried by the lower end of the cable.

In the operation of my improved hoisting and conveying apparatus seen in Figs. 1 to 6, inclusive, assuming that the receptacle 12 and carriage 2 are returning from the dumping-place down the incline track, such movement being controlled by the same power which draws the carriage up the incline, then as soon as the carriage reaches or approaches the abutment 15 the free end of the arm 17 will engage and ride upwardly upon the incline faces of the abutment, and thereby rock the arm 9 out of holding engagement with the lug 11 of the receptacle 12, as shown by dotted lines in Fig. 1, and at about the same time the detent 17 is brought into engagement with the shaft 5 to lock the carriage from being drawn up the incline. It is now apparent that by slackening the cable 13 the bucket may be lowered to the place of filling, and after being filled power is again applied to the cable 13 to hoist the filled receptacle until the clamp or shoulder 20 on the cable engages the member 21 and trips the detent 17. This immediately releases the carriage, and the weight of the load and also the draft upon the cable causes the carriage to be drawn up the incline; but in doing so the free end of the arm 17 rides down the incline of the abutment 15 and permits the hook 10 to drop by gravity into holding engagement with the lug 11 of the receptacle 12, thereby transferring the load from the cable directly to the carriage, and the hauling operation may then be continued until the carriage is drawn up the incline to the place of discharge.

The construction and operation of the receptacle 12 are immaterial, as any suitable dumping-receptacle may be used in connection with the apparatus herein described.

The operation of the device seen in Figs. 7 to 14, inclusive, is similar to that just described for the device seen in Figs. 1 to 6, except that the incline abutment 15 is dispensed with and the swinging support 9 comes in direct contact with an abutment 26 when the carriage descends to its lowest position, thereby releasing the arms 25 from holding engagement with the clamp 20, as previously stated.

Having thus described my invention, what I claim, and desire to secure by Letters Patent, is—

1. In a hoisting and conveying apparatus, the combination with an inclined track and a carriage thereon movable by gravity down the track, a cable to draw the carriage up the track, a detent at the low end of the track separate from the carriage to engage and hold the latter, a load-holding device on the carriage movable to its holding position by gravity, and an inclined fixed abutment to trip said device from its holding position as the carriage descends.

2. In a hoisting and conveying apparatus, the combination with an inclined track and a carriage on the track descending by gravity, a cable connected to the carriage to draw it up the track, a shoulder on the carriage, a pivoted detent at the low end of the track and engaging said shoulder to lock the carriage, a load-holding device pivoted to the carriage, means brought into action by the descent of the carriage to trip said holding device, a device upon the cable to directly engage and trip the detent as the cable is hoisted.

3. In a hoisting and conveying apparatus, the combination with an inclined track and a carriage on the track descending by gravity, a sheave on the carriage, a cable rendering over the sheave and having one end adapted to be connected to a winding device and its other end connected to the load, a pivoted detent at the low end of the track for engaging and holding the carriage while the load is being hoisted, and a device on the cable to directly engage and trip the detent from its holding position as the load is elevated.

4. In a hoisting and conveying apparatus, the combination with an inclined track and a carriage having bearings engaging the lower and upper faces of the track at points one in advance of the other, a sheave on the carriage, a cable riding on the sheave, a fixed support, a detent pivoted to the support to engage and hold the carriage, and a device on the cable to directly engage the detent for tripping the latter as the load is hoisted.

In witness whereof I have hereunto set my hand this 7th day of April, 1904.

EDWIN MERRITT HOLMES.

Witnesses:
HAROLD D. FOX,
RICHARD WILSON.